United States Patent [19]

Weaver

[11] 4,155,411

[45] May 22, 1979

[54] AUTOMATIC ZERO-CORRECTION FOR WEIGHING SYSTEM

[75] Inventor: George R. Weaver, Maple Shade, N.J.

[73] Assignee: Campbell Soup Company, Camden, N.J.

[21] Appl. No.: 844,294

[22] Filed: Oct. 21, 1977

[51] Int. Cl.² .................................... G01G 23/16
[52] U.S. Cl. .............................. 177/165; 177/DIG. 3
[58] Field of Search ................... 177/25, 165, DIG. 3, 177/164, 50

[56] References Cited

U.S. PATENT DOCUMENTS

| | | | |
|---|---|---|---|
| 3,797,595 | 3/1974 | Yin | 177/164 |
| 3,800,893 | 4/1974 | Ramsay | 177/164 X |
| 3,802,522 | 4/1974 | Thompson | 177/165 X |

Primary Examiner—Joseph W. Hartary
Attorney, Agent, or Firm—Howson and Howson

[57] ABSTRACT

In an object weighing system, apparatus for automatically adjusting the zero-reference value of a weight-representing signal to a desired value equal to that signal level which would produce an indication of zero weight by the system. To accomplish this, the absolute value of the signal is detected and applied to a voltage-to-frequency converter, the pulses from which are counted in an up/down binary counter only when no object is being weighed; the direction of count is controlled by a polarity-representing signal applied to the voltage-to-frequency converter. The instantaneous running count in the counter is applied to a digital-to-analog converter, to produce a correction signal of substantially the same magnitude as the amount by which the zero-reference value departs from said desired value. This correction signal is combined with the unadjusted weight-representing signal in the polarity to drive the zero-reference value toward said desired value. Between successive non-weighing intervals, the feedback loop through the automatic zero-correction circuit is held open, but the previously-attained count and correction voltage are maintained, so that the zero-reference value of the weight-representing signal is also maintained at the desired value during the weighing intervals. The same pulses used for the automatic zero correction are also counted during the weighing intervals by another counter to produce signals indicative of the weight of the object being weighed.

5 Claims, 1 Drawing Figure

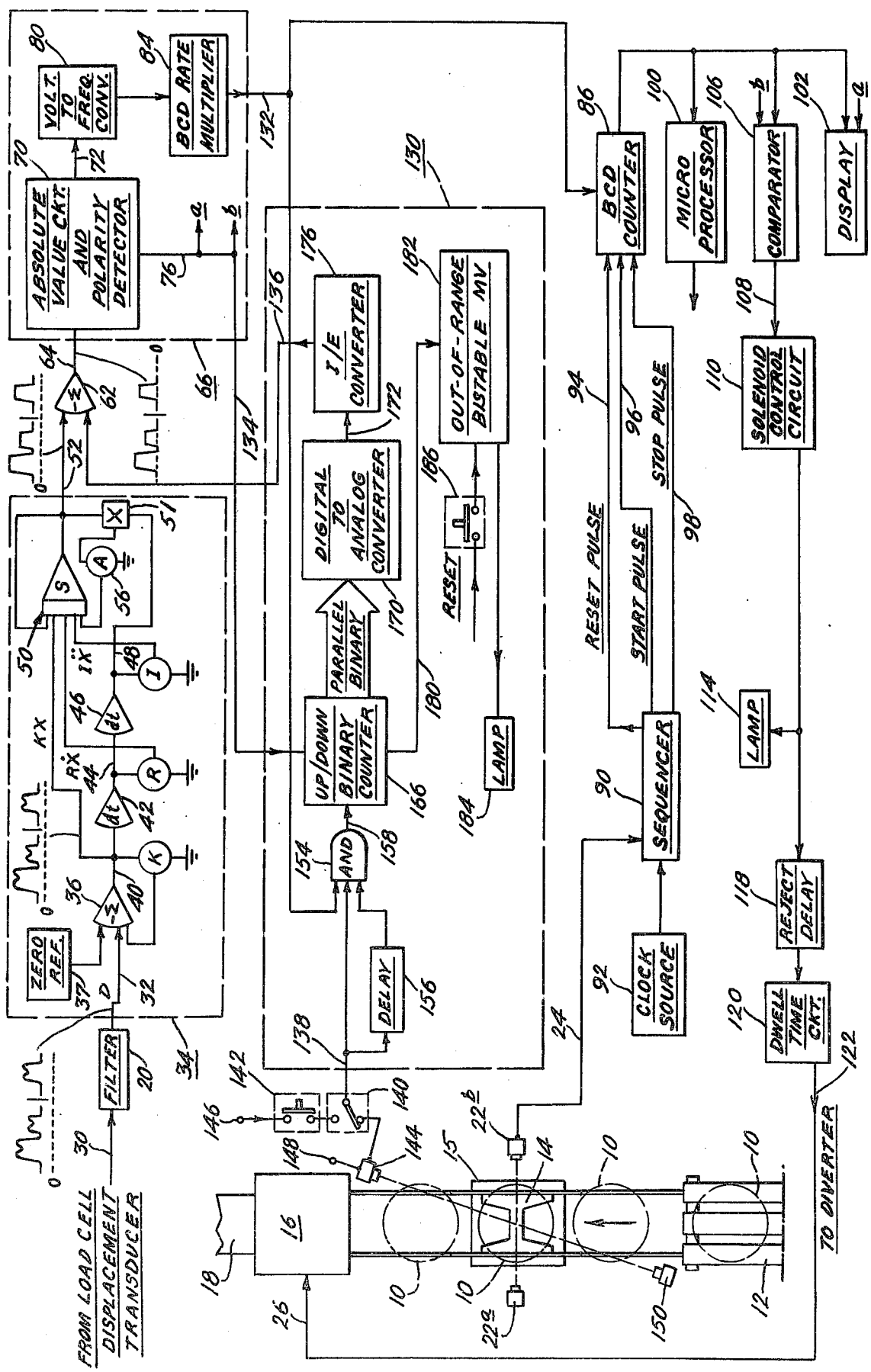

AUTOMATIC ZERO-CORRECTION FOR WEIGHING SYSTEM

BACKGROUND OF THE INVENTION

In weighing systems generally, it is ordinarily desirable or essential that the output indication of the weighing system indicate a predetermined reference value, ordinarily zero, when no object is being weighed, so that the change in the output indication produced by an object being weighed will accurately represent the true weight of the object. While it is usually easy to construct and adjust a weighing system initially to provide the desired output indication of zero when zero weight is being applied, the zero reference usually tends to change somewhat with time, usually randomly and unpredictably, due to factors such as changes in the system components caused by aging or ambient temperature change or the like, or such changes in the zero reference may occur because of inadvertent changes in the tare weight of the system, for example due to undersired accumulation of foreign matter on the weight-receiving platform or its supports. Any such changes in the zero reference setting will produce corresponding errors in the indicated weight of the object.

It is therefore common to provide a manually-operable zero-set control in weighing systems, so that when an operator observes that the ouput indication is not zero under steadystate conditions between successive weighings, he can readily adjust the manual control until the output indication becomes zero again under these conditions. However, this requires that an operator observe the discrepancy in zero setting, and interrupt the weighing long enough to re-set the zero as accurately as his visual acuity, manual dexterity and carefulness permit.

The present invention is particularly concerned with, and will be described with special reference to, the general type of automatic electronic weighing system which is described and claimed in U.S. Pat. No. 3,800,893 of J. D. Ramsay and G. R. Weaver, filed Sept. 5, 1972 and issued Apr. 2, 1974, and more recent modifications thereof. In such systems, successive objects to be weighed are moved sequentially and rapidly onto and from the weighing platform of a spring-restrained balancebeam type of weigh cell, and three separate electrical signals are derived representing, respectively, the instantaneous displacement, velocity and acceleration of the weighing platform and object produced in response to the weight of that object. These three signals are fed into a circuit, which, in effect, solves the second-order differential equation of motion of the platform and object, to produce an output signal representing the weight of the object. With this arrangement, it is not necessary to wait for oscillations of the weigh cell to die out in order to obtain a proper weight indication, and in fact weight indications are commonly obtained by such sensing and measuring of the platform motion during a cycle or two, or even a fraction of a cycle, of its oscillation. Because of this, weighing can be accomplished in an extremely short time, even with a lightly damped weigh cell, and hundreds of objects are readily weighed per minute.

In the weighing system of the above-cited patent, the electrical circuit which solves the second-order differential equation of motion, herein designated as the resolver circuit, produces an electrical analog output in the form of a current or voltage the level of which, during weighing time intervals in which the weight is on the platform and the system in a stable oscillatory condition, represents the object weight. During each such interval, a time-controlled analog integrator responds to the resolver output signal to produce an output signal which is representative of the integrated value of the output signal during such interval, and is used as an indication of object weight.

Since the development of the above-described analog weighing system of the cited patent, a modification of the above-described time-controlled analog integrator has been developed, employing instead a digital integrator which produces output pulses at a rate proportional to the instantaneous level of the output signal from the resolver, and a time-controlled BCD counter which is controlled to count the number of such pulses occurring during the desired weighing time interval for each object to be weighed. The successive counts thereby accumulated in the binary counter represent the weights of the successive objects being weighed. Such successive digital weight indications may be visually displayed, printed out, or used for a variety of control functions. In one specific application in which the weighing system is to be used for the purpose of sorting out filled food containers which are underweight, the binary counter output may be supplied to a comparator, which produces an output control signal whenever the indicated weight is less than the predetermined desired weight, and operates a diverter for removing such underweight containers from the train of objects being weighed; various alarm devices may also be automatically operated under such condition. The times during which the binary counter operates to perform its counting function may be initiated by a start pulse produced in response to photoelectric or other detection of the arrival of the object to be weighed into its proper weighing position, the count being terminated a predetermined time interval later.

In both the analog and digital systems described above, the analog output of the resolver circuit is intended to remain at a constant reference value, i.e. zero, when no object to be weighed is positioned on the weigh cell. To accomplish this, a controllable DC zero-reference correction voltage is preferably generated and substracted from the input displacement signal to the resolver, and manually adjusted in the absence of an object in weighing position so that the resolver circuit then exhibits zero output. If departures of the resolver output voltage from zero reference value are observed, the zero reference voltage at the resolver input can be manually adjusted to re-establish the desired zero setting.

It is also known to be possible to accomplish automatic zero correction by sensing the analog output voltage of the resolver and feeding it back in degenerative polarity to the input to the resolver during non-weighing intervals, thereby automatically to reduce the resolver output voltage to the desired zero reference value; in such a system, an analog hold circuit would be included in the negative feedback path, the function of which is to hold the feedback correction voltage from the end of one such zero-correction time, through one or more intervening weighing intervals, until a later non-weighing correction interval.

The present invention is concerned with an improved electronic automatic zero correction apparatus adapted for use in the type of automatic weighing system employing a digital integrator, which is simple, accurate, compact, and not subject to substantial overshoot of the correcting signal, nor to drift of correction voltage in the weighing intervals between correction times, and which provides zero correction for changes in operating characteristics of the circuit up through the output of the digital integrator, and not merely up to the output of the resolver circuit.

SUMMARY OF THE INVENTION

The objects of the present invention are achieved by the provision of an automatic zero correction apparatus comprising an up/down binary counter responsive to pulses from the digital integrator during non-weighing times to produce a stored electrical running count thereof, a digital-to-analog converter for converting the running count into an analog correction signal, and means for combining the correction signal with the weight-representing analog signal in the polarity to reduce the rate at which pulses are applied to the up/down binary counter.

Preferably the digital integrator includes an absolute-value circuit which produces an output signal proportional to the absolute value of the zero-corrected signal from the resolver circuit, and the output of the absolute-value circuit is applied to a voltage-to-frequency converter for producing pulses of a repetition rate proportional to the absolute value of the zero-corrected resolver output signal. A polarity detector is also employed, which senses the polarity of the zero-corrected signal from the resolver circuit, and controls the up/down binary counter to cause the up/down binary counter to count up for one direction of deviation of the resolver output from the desired zero value, and to count down for the opposite direction of deviation, so as to accomplish the desired correction by the analog correction signal.

In operation, the feedback loop from the digital integrator to the up/down counter is effectively interrupted, either by manual action or entirely automatically, when the weighing operation is taking place; during at least some of the nonweighing intervals, when no weighing operation is taking place or imminent, the automatic zero-correction circuit is operatively connected into the system, again either by manual action or entirely automatically. At the latter times, any deviation of the corrected resolver output voltage from the desired zero value will produce an output from the absolute value circuit and from the polarity detector. The voltage-to-frequency converter, which produces no output in the absence of an input voltage thereto, responds to any such error-indicating output from the absolute-value circuit to produce output pulses at a rate proportional to the magnitude of the error in corrected resolver output signal. Thus if the corrected resolver output signal differs substantially in either polarity from its desired reference value, the voltage-to-frequency converter will produce output pulses initially at a relatively high rate, which will be counted by the up/down binary counter to produce a correcting analog signal of substantial value to begin correction of the resolver output signal. As the corrected resolver output signal is thereby changed toward its desired zero reference value, the frequency of the pulses from the voltage-to-frequency converter decreases, and becomes substantially zero when the desired value of corrected resolver output signal is attained, thereafter producing only an occasional pulse to move the count in the up/down binary counter up or down by only a pulse or two to maintain the desired corrected zero-reference value. While the automatic zero correction circuit is effectively disconnected, manually or automatically, during the weighing process, the up/down binary counter will hold its count, and the analog correction signal will remain constant until the next time that the automatic zero-correction feedback circuit is again fully operative, at which time any necessary further correction will be made automatically.

It is noted that, since the frequency of pulses from the voltage-to-frequency converter is large for substantial deviations of the resolver output reference voltage from its desired value, rapid correction will be initially effected, but as the desired complete correction is approached, the frequency of these pulses will decrease proportionally, so that the rate of approach to the desired corrected zero reference voltage decreases, and any tendency toward substantial overshoot beyond or about the desired corrected value is minimized. Furthermore, since the up/down binary counter retains its count permanently in the absence of counting pulses applied thereto, there is no need for special elaborate holding circuits to prevent droop of the correction voltage between successive correction as is usually required where conventional analog zero-correcting circuits are used. Further, since zero-correcting feedback is taken from a point following the voltage-to-frequency converter, the system operates to assure that the proper near-zero frequency of pulses from the voltage-to-frequency converter is produced at the end of each correction, thus providing proper zero correction for deviations in operating characteristics of the entire system from the load cell up to the output of the digital integrator.

In addition, the circuit makes use of a substantial number of components already present in the system to which the zero correction is being applied, the components in the automatic correction circuit itself being relatively few and standard in nature per se. Accordingly, the automatic zero correction circuit is not only simple, accurate and inexpensive, but in addition, because it does not interfere with the normal operation of the remainder of the system, it can be provided as an optional element for simple plug-in modification of the weighing system, without requiring modification of the remainder of the system.

BRIEF DESCRIPTION OF FIGURES

These and other objects and features of the invention will be more readily understood from a consideration of the following detailed description of a representative embodiment thereof, taken together with the accompanying drawing, which is a schematic diagram largely in block form illustrating a preferred embodiment of the invention.

DETAILED DESCRIPTION OF SPECIFIC EMBODIMENTS

Referring now to the embodiment of the invention illustrated in the drawing by way of example only, at the left of that FIGURE there is shown schematically a top view of a portion of a conveyor line for rapidly conveying a series of spaced-apart food containers, such as cans 10, from an accelerating conveyor 12 onto the weighing platform 14 of a weigh cell 15, and thence through a diverter station 16 to a downstream continuation 18 of the conveyor line. The weigh cell may, for example, be like that in the above-cited Ramsay and Weaver patent, or for example may be like that described and claimed in co-pending application Ser. No. 842,599 of Alec Smith, filed Oct. 17, 1977 and of common assignee herewith. In the present example, it is assumed that the weigh cell is equipped with an appropriate displacement transducer producing a displacement signal representative of the instaneous displacement of the weight-receiving platform of the weigh cell in response to the weight of an object thereon, and that this displacement signal is fed into the input of filter 20. Also shown is a light source 22a and a corresponding photodetector 22b, positioned at opposite sides of the conveyor line at the location of the weigh cell, whereby interruption of light travelling from the lamp to the photodetector produces a timing signal on line 24 indicative of when each can is at the weighing position. The diverter 16 may be an appropriate device responsive to a control signal supplied to its input line 26, selectively to divert underweight cans from the train of cans; the diverter may, for example, be a mechanically-actuated device, an air blast device, or of any other appropriate known construction. The general form of the conveyor line assembly shown schematically is merely for the purpose of illustrating one possible application of the invention, and suitable arrangements thereof, and teachings relative to its adjustment and use, may be found in the above-cited patent of Ramsay and Weaver and in the above-cited co-pending application of Alec Smith.

There will next be described an automatic electronic high-speed weighing system in the nature of a checkweigher, for detecting the presence of an underweight filled can and for effecting diversion of it from the train of cans, after which the automatic zero-correction apparatus of the invention, and its connection and cooperation with the overall weighing system, will be described in detail.

The displacement signal on line 30 is preferably passed through low-pass filter 20, whereby the oscillatory displacement signal produced during weighing is formed into a more pure sinewave, and extraneous "noise" signal components are minimized. A portion of a possible waveform for two closely-spaced cans and a third, more widely spaced can is shown in idealized form adjacent line 32. Each can produces a sinusoidal waveform of an amplitude which is generally greater for heavier cans. This output of filter 20 is supplied to the input line 32 of resolver circuit 34, which may be similar in principle and, largely, in construction, to the resolver circuit described in the above-cited Ramsay and Weaver patent. However, in the present example the velocity- and acceleration-representing signals are both derived electronically from the displacement signal, rather than utilizing a separate velocity transducer at the weigh cell for generating the velocity signal.

More particularly, in this example the resolver circuit 34 comprises a signal subtractor 36 supplied with the displacement signal and with a zero-reference adjustment signal from the zero reference adjustment circuit 37, and responds thereto to produce at its output line 40 the displacement signal KX, representing the displacement signal from filter 20 minus the bias level supplied by the zero reference adjustment circuit 37. A gain-adjustment circuit K permits adjustment of the signal at output 40 so that it is related to the displacement by the selected proportionality factor K. While it is usually intended that the zero reference adjustment 37 be adjusted so that the zero reference of the signal on line 40 be zero, the waveform adjacent line 40 shows a substantial error in this respect, in that the reference level of the signal during non-weighing times is appreciably greater than zero, as may occur due to initial misadjustment but much more usually because of drift occurring after initial adjustment.

The signal on line 40 is supplied to the input of a differentiating circuit 42 which forms on its output line 44 a signal proportional to the derivative of displacement with respect to time, the proportionality factor being adjusted by the circuit R so that this latter output is equal to the quantity $R\dot{X}$. The output on line 44 is supplied to another differentiating circuit 46 to produce at the output thereof a signal proportional to the second derivative of X with respect to time, the proportionality factor being set by circuit I so that the signal on line 48 equals $I\ddot{X}$.

As described in detail in the above-cited patent of Ramsay and Weaver, the signals KX, $R\dot{X}$ and $I\ddot{X}$ are supplied to three separate inputs of a high-gain analog summing integrator 50 acting as an implicit resolver to produce on its output line 52 a signal indicative of the weight of the object being weighed. In this circuit the output of the integrator is fed back to its input through a DC connection and through a capacitor to the integrator input. The integrator output is also coupled back through a multiplying circuit 51 and scaling circuit 56 to another input of integrator 50.

The details of these and other features of construction and operation of the analog summing integrator amplifier and the circuits connected thereto are fully described in the above-cited patent of Ramsay and Weaver, and hence need not be repeated here. Suffice it for the purposes of this application to note that the output of summing amplifier on line 52 constitutes the output of the resolver circuit, obtained by electronic solution of the second-order differential equation of motion of the platform and weight in the weighing system, which solution during the stable weighing interval represents the weight of the object on the scale, and with no object on the scale represents zero weight. It is further noted that resolver 34 includes a direct-coupled signal path extending from the input line 30 to the output line 52, so that the DC level at line 52 is proportional to the DC level at the resolver input line 32, and so that the DC level at the output line 52 is adjustable in response to adjustment of the zero reference adjustment 37. Thus, when objects are not being weighed and the weigh cell has come to its rest position, the zero reference adjustment 37 may be manually adjusted to provide substantially the desired zero reference value at output lead 52. However, in this example the waveform at line 52, shown adjacent thereto, still exhibits a reference level error. More particularly, the level during non-weighing times is shown as somewhat positive, which may occur due to original misadjustment of the manual zero reference adjustment, or more usually to drifts in the characteristics of the system. The object weight is properly represented by the component of the waveform extending from the non-weighing time level to the substantially flat top of each pulse in the waveform, but the level of the tops of the pulses with respect to zero is in error by the amount of the DC reference level offset from zero.

The output signal from resolver circuit 34 appearing on line 52 is then applied to one input terminal of the subtractor 62; the other input terminal of subtractor 62 is supplied with an output signal from the automatic zero correction circuit to be described hereinafter. Thus subtractor 62 serves to modify or correct the zero reference value of the output of the resolver circuit, the corrected resolver output signal appearing at output line 64 of subtractor 62.

The signal waveform on line 64, as represented adjacent that line, exhibits a corrected reference level of zero, accomplished by use of the automatic zero correction circuit of the invention. Such level is the desired value provided, as assumed in this illustration, no DC error is introduced by the following digital integrator 66. As will become more apparent hereinafter, if the digital integrator 66 does introduce some error, which would tend to cause an appreciable undesired rate of generation of output pulses by the digital integrator in response to the zero level of input signal applied to it, the automatic zero correction circuit will compensate for this by holding the reference level appropriately offset from zero at the input to the digital integrator to effect the desired overall zero correction.

Digital integrator 66, to which the signal on line 64 is applied, comprises an absolute value circuit and polarity detector 70, supplied at its input terminal with the signal on lead 64 and operative to produce on its output lead 72 a signal proportional to the absolute value of the signal at its input; that is, the signal on lead 72 has an instantaneous amplitude proportional to the instantaneous value of the signal on input lead 64, but is always of one polarity regardless of the polarity of the signal on line 64. Absolute-value circuit and polarity detector 70 also produces on another output lead 76, a signal indicative of the polarity possessed by the signal on input line 64, the resultant polarity signal being distributed to the various other elements of the system for purposes described hereinafter.

Digital integrator 66 also comprises a voltage-to-frequency (V/F) converter 80 supplied with the absolute-value signal on line 72, and has the characteristic that when a zero signal level is applied to its input it produces no output pulses, but when the input signal departs from zero in the polarity of the signals on input lead 72, it then produces output pulses recurrent at a frequency proportional to the instantaneous amplitude of the signal supplied to it over line 72. Both the absolute-value circuit and polarity detector 70, and the V/F converter 80, may constitute well-known standard circuits familiar in themselves to those skilled in the art.

In the present embodiment, digital integrator 66 also preferably comprises an adjustable binary coded decimal (BCD) rate multiplier 84 to which the output of V/F converter 80 is supplied, the effect and purpose of which is to permit manual adjustment of the scale factor between the voltage on lead 72 and the actual recurrence rate of pulses produced by the digital integrator. In essence, it removes a certain proportion of the pulses which would otherwise by produced in a given short time interval, as a convenience in selecting and operating the counters to which it supplies its output pulses. Such devices being well known in the art, it is unnecessary to describe the rate multiplier in detail herein. In general, however, the recurrence rate of the output pulses from the multiplier produced in response to a substantial signal level on line 72 is such that very many such pulses will occur during each weighing time interval. The total number of such pulses produced during each weighing time interval corresponds to the integrated value of the level of the signal at line 72 during weighing, and hence provides an integrated indication of the weight of the object being weighed.

The output of rate multiplier 84 is supplied to BCD counter 86 which, during its active time, counts the pulses produced by digital integrator 66 and thus provides the desired integrated indication of the weight of the object being weighed. Operation of counter 86 is preferably restricted to an interval starting when an object to be weighed has moved onto the weighing platform and a short settling interval has transpired, and ending before the object leaves the weighing platform.

In this example, this is accomplished by means of a sequencer 90 supplied with clock pulses from a clock source 92 and with initiating pulses over lead 24 from photodetector 22b. Shortly after the receipt of the pulse on line 24, sequencer 90 produces a short reset pulse which is applied to binary counter 86 to reset it to zero, thus cancelling its previous count. A short period after the reset pulse, the sequencer 90 produces a start pulse on line 96, which enables counter 86 to begin counting the pulses from digital integrator 66; at this point the object to be weighed is on the platform scale and settling has been completed, so that proper weighing can take effect. Subsequently, after the selected weighing time has transpired, sequencer 90 produces on line 98 a stop pulse which stops counter 86 from counting further. The time between start pulse and the stop pulse is maintained constant with a high degree of accuracy, so that the count accumulated by counter 86 accurately represents the weight of the object on the scale during this time.

The weight-indicating count in counter 86 may then be used for any of a variety of purposes. It may for example be applied to a micro-processor 100 and utilized therein to accomplish any desired computational or control purposes.

It may also be applied to a display device 102, which may for example contain a visual digital read-out for displaying the object weight in predetermined units. For the latter purposes, the polarity indicating signal from line 76 may be supplied over line a—a to the display device as shown, to permit a simultaneous display of a possible negative weight indication which can occur under unusual circumstances if the zero reference has drifted excessively and the object weight is very small.

The output of the counter 86 may also be applied to a comparator 106 to produce on comparator output line 108 a control signal level indicating whether the object weight is below standard. For such purpose, digital information representative of the minimum standard weight is stored in the comparator, and automatically compared with each object weight signal from counter 86. The latter control signal may be used to operate a solenoid control circuit 110, which in turn may operate a lamp 114, and in some cases a stop switch for stopping the conveyor line. To enable the comparator 106 to operate properly for all conditions, it is preferably also supplied with the polartiy signal over connection b—b. In this example, however, the control signal from solenoid control circuit 110 is preferably supplied through a reject delay circuit 118, which provides a delay permitting the underweight can to travel along the conveyor to the diverter 16 before the diverter is operated. The reject delay 118 preferably supplies the diverter actuating signal to a dwell time circuit 120, which produces a pulse of the desired duration corresponding to the time duration for which the diverter is to be operated. Accordingly, the diverter control signal on output line 122 of dwell time circuit 120, supplied to diverter 16, causes the diverter to operate at the time, and for a time interval, suitable for diversion of the underweight can from the train of rapidly-moving cans of proper weight.

The foregoing detailed description relates to a weighing system which can be operated without the automatic zero correction apparatus of the present invention, but in combination with which the automatic zero correction circuit of the present invention provides the new and improved operation described herein.

Turning now to the specific embodiment of automatic zero-correction circuit shown in the FIGURE at 130, it will be seen that, in overall operation, the circuit 130 is supplied over lead 132 with the input pulses from the digital integrator 66, is supplied over lead 134 with the polarity-indicating signal from the polarity detector in digital indicator 66, and supplies its zero-reference correction signal over lead 136 to one input of subtractor 62, to produce the desired corrected resolver output signal at line 64. Circuit 130 is also controlled over line 138 so as to be operative to effect the desired zero correction during non-weighing intervals of the weigh cell, but to be nonresponsive to feedback information at other times during which it merely maintains constant the analog correction voltage then being applied to line 136.

More particularly, input line 138 is connected, through manually-operable mode switch 140, alternatively to pushbutton switch 142 or to photodetector 144. The opposite terminal of switch 142 is connected to an appropriate positive voltage source 146, so that when mode switch 140 is in its upper position and pushbutton 142 held actuated, a positive signal will be applied to input line 138. Similarly, with mode switch 140 in the downward position as shown, a positive voltage applied to terminal 148 of photodetector 144 will cause a positive voltage level to appear on lead 138 whenever photodetector 144 is strongly illuminated.

A light source 150 is located on the opposite side of the train of cans from photodetector 144, and spaced along the can conveyor in such a way that the light beam 152 from light source 150 reaches photodetector 144 along a diagonal path only if there are no intervening cans. As shown, for high-speed weighing the cans will typically be so close together much of the time, that the photodetector 144 will not be illuminated during such operation. However, with greater can spacings the photodetector 144 will be illuminated at times, and, even with high-speed weighing, there are usually times at which there is a substantial gap between successive cans, which will provide at least occasional illumination of photodetector 144. Thus application of a positive voltage level to input line 138 may be accomplished either in a manual mode by operation of pushbutton 142 when no cans are present, or in a completely automatic mode in response to photodetector 144 at times when the gaps between cans are sufficiently great.

It is also noted that the arrangement of light source 150 and photodetector 144 is such that if a can is on the weigh cell, or is positioned to move on to the weight cell very soon, the photodetector 144 will not be actuated by the light beam. Accordingly, application of a positive voltage level to input line 138 by the photodetector 144 can only occur at suitable nonweighing times, i.e. at times when there is no can on the weigh cell and none is about to be moved onto the weigh cell, thereby providing time for operation of the zero correction circuit before another can reaches the weighing platform.

Input line 138 is connected to one input terminal of AND gate 154, and through a delay circuit 156 to another input of AND gate 154. The other of the three inputs of AND gate 154 is connected to the line 132 which is supplied with the output digital integrator 66. AND gate 154 exhibits the usual characteristic of producing a signal on its output line 158 when and only when positive signal levels are applied simultaneously to all three of its input terminals. Delay circuit 156 may be manually adjustable, and serves the function of providing a conveniently adjustable delay period of small duration following actuation of photodetector 144 before AND gate 154 will be rendered transmissive of the pulses from the digital integrator 66, thereby providing a convenient timing adjustment for the system. Such delay prevents undesired actuation of the zero-correction circuit in response to very small spacings between successive cans. In any event, AND gate 154 will be rendered transmissive of pulses from the digital integrator 66 a very short time after operation of either photodetector 144 or manual pushbutton switch 142.

The pulses from digital integrator 66 passing through AND gate 154 are applied to the input of the up/down binary counter 166. Counter 166 may be of entirely conventional form, so as to count upward when the polarity signal on lead 134 indicates that the corrected resolver output signal on lead 64 departs in a first polarity from the desired standard zero reference value, and to count downward when the signal on lead 134 indicates the opposite condition of polarity. As an example only, counter 166 may be an 8-bit binary counter producing a parallel binary output, which is supplied to the input of digital-to-analog converter 170. Converter 170 may be entirely conventional in itself, serving the function of producing on its output lead 172 an analog electrical quantity proportional to the instantaneous value of the count being applied to its input.

In this example it is assumed that the analog output of the converter 170 is electrical current, and that the subtractor 62 is a voltage operated device. Accordingly, a current-to-voltage (I/E) convertor 176 is employed which is supplied with the current output of the digital-to-analog converter 170, and supplies the analog correction voltage over line 136 to the subtractor 62 as shown. If the digital-to-analog converter is of the voltage output type, or the subtractor 62 is of a current-operated type, no current-to-voltage or voltage-to-current conversion circuit is required.

In this embodiment of the invention there is made conveniently available an indication of when the apparent zero error is so great that it indicates the possibility of some major malfunction or debilitating condition in the system, other than normal zero drifts. For this purpose, binary counter 166 may include a conventional circuit for producing a "carry" signal when the count in counter 166 exceeds its maximum count capability, and this carry signal is supplied over lead 180 to the out-of-range bi-stable multivibrator 182 to actuate it from a normal to an alarm condition thereof; in its alarm condition, the output of the multivibrator is applied, for example, to illuminate a warning lamp 184. After the abnormal condition producing the out-of-range count has been corrected, the manually-operable reset switch 186 may be actuated to reset multivibrator 182.

In operation then, the zero reference correction circuit 130 is placed into full operation during non-weighing intervals whenever there is no can on the weigh cell and none about to reach it, assuming the mode switch 140 is in the position shown; alternatively, an observer may discern visually when this condition of the cans obtains, and operate the pushbutton switch 142 with the mode switch 140 in its upward position to actuate the automatic zero reference correction circuit. In either event, if the corrected resolver output voltage on lead 64 is above or below the desired reference value, here taken to be zero, the digital integrator 66 will supply pulses of given polarity over line 132 at a recurrence rate which is greater the greater the extent of deviation of the corrected reference voltage from the desired reference value thereof. These pulses will be counted in the up/down binary counter 166 and the instantaneous running count existing at any time applied to the digital-to-analog converter 170, which derives therefrom an analog current proportional to the count then in counter 166; this current is passed through the I/E converter 176 to the input of subtractor 62 in a polarity to correct the reference voltage on line 64 toward the desired standard value for which substantially no pulses will be produced by the digital integrator. As this correction occurs, the frequency of pulses from the digital integrator will decrease rapidly, the counting rate of counter 166 will decrease correspondingly, and the voltage on lead 64 will approach its desired reference value more slowly as the desired final value is approached more closely, thus avoiding a tendency towards substantial overshoot. By way of example only, in one specific application of the invention, substantially complete correction was readily obtained in 6 milliseconds or less. The circuit also assures that the same correction voltage will be maintained when the correction time is terminated automatically by darkening of photodetector 144 of by release of pushbutton 142. This correction voltage will be maintained as long as required, until another correction interval is started, at which time any further correction will be automatically accomplished.

While it has been found advantageous to apply the analog correction voltage over line 136 to the subtractor 62, it is possible to supply the correction voltage at an earlier point in the system, for example to the same subtractor to which the zero reference source 37 is connected. However, it is preferred to apply the correcting voltage to the output signal from the resolver, since undesirable signal delays in the zero-correction control loop are thereby minimized.

Thus while the invention has been described with particular reference to specific embodiments thereof in the interest of complete definiteness, it will be understood that it may be embodied in a variety of forms diverse from those specifically shown and described, without departing from the spirit and scope of the invention as defined by the appended claims.

What is claimed is:

1. In an electrical weighing system, comprising: means for producing a first analog signal having a DC reference value during non-weighing times when no object is being weighed, and having instantaneous values, during weighing time intervals in which an object is being weighed, which is the sum of said DC reference value and a component dependent upon the weight of an object being weighed, said DC reference value tending to change over a period of time; zero-correction means responsive to said first analog signal for adjusting the DC level thereof to produce a zero-corrected analog signal; absolute-value detector means responsive to said zero-corrected analog signal for producing an absolute-value analog signal representing the absolute value of said zero-corrected analog signal; polarity detector means for producing a polarity signal representative of the polarity of said zero-corrected analog signal being applied to said absolute-value detector; means responsive to said absolute-value analog signal for producing pulses at a recurrence rate proportional to the instantaneous value of said absolute-value analog signal; and means responsive to said pulses for producing a weight-indicating signal representative of the number of said pulses produced in each of said weighing time intervals;

the improvement wherein said zero-correction means comprises binary up/down counter means responsive, during at least some selected non-weighing times, to said pulses and to said polarity signal, for producing binary electrical signals representing the algebraic running total of the number of those of said pulses occuring during said selected non-weighing times, and for maintaining said running total at its last-achieved value throughout the time between each selected non-weighing time and the next selected non-weighing time, said counter counting upward when said polarity signal indicates a first polarity of zero-corrected analog signal and downward when it indicates the opposite polarity thereof;

digital-to-analog converter means supplied with said binary electrical signals for producing an analog correction signal substantially proportional to said running count; and means for combining said analog correction signal with said first analog signal in the polarity to reduce said recurrence rate of said pulses toward zero.

2. The system of claim 1, in which said system comprises means for producing a displacement signal representative of the instantaneous displacement of an object being weighed, means for producing a velocity signal representative of the velocity of said object being weighed, means for producing a signal representative of the acceleration of said object being weighed, resolver means responsive to said displacement signal, to said velocity signal and to said acceleration signal for electrically setting up and solving the equation of motion of said object being weighed to produce said first analog signal, and wherein said component of said first analog signal is proportional to the weight of said object being weighed.

3. The system of claim 2, wherein said means for combining said analog correction signal with said first analog signal is positioned in the system to receive said first analog signal produced by said resolver means and to supply to said absolute-value circuit the signal resulting from said combining.

4. The system of claim 1, wherein said up/down counter means comprises means for producing a control signal whenever said running count reaches a predetermined abnormally high level, said system also comprising indicator means responsive to said control signal for producing an indication of said abnormally high count.

5. The system of claim 4, wherein said control signal is a carry signal of said up/down counter.

* * * * *